(No Model.)
E. HART.
APPARATUS FOR CONCENTRATING ACIDS.
No. 601,466. Patented Mar. 29, 1898.
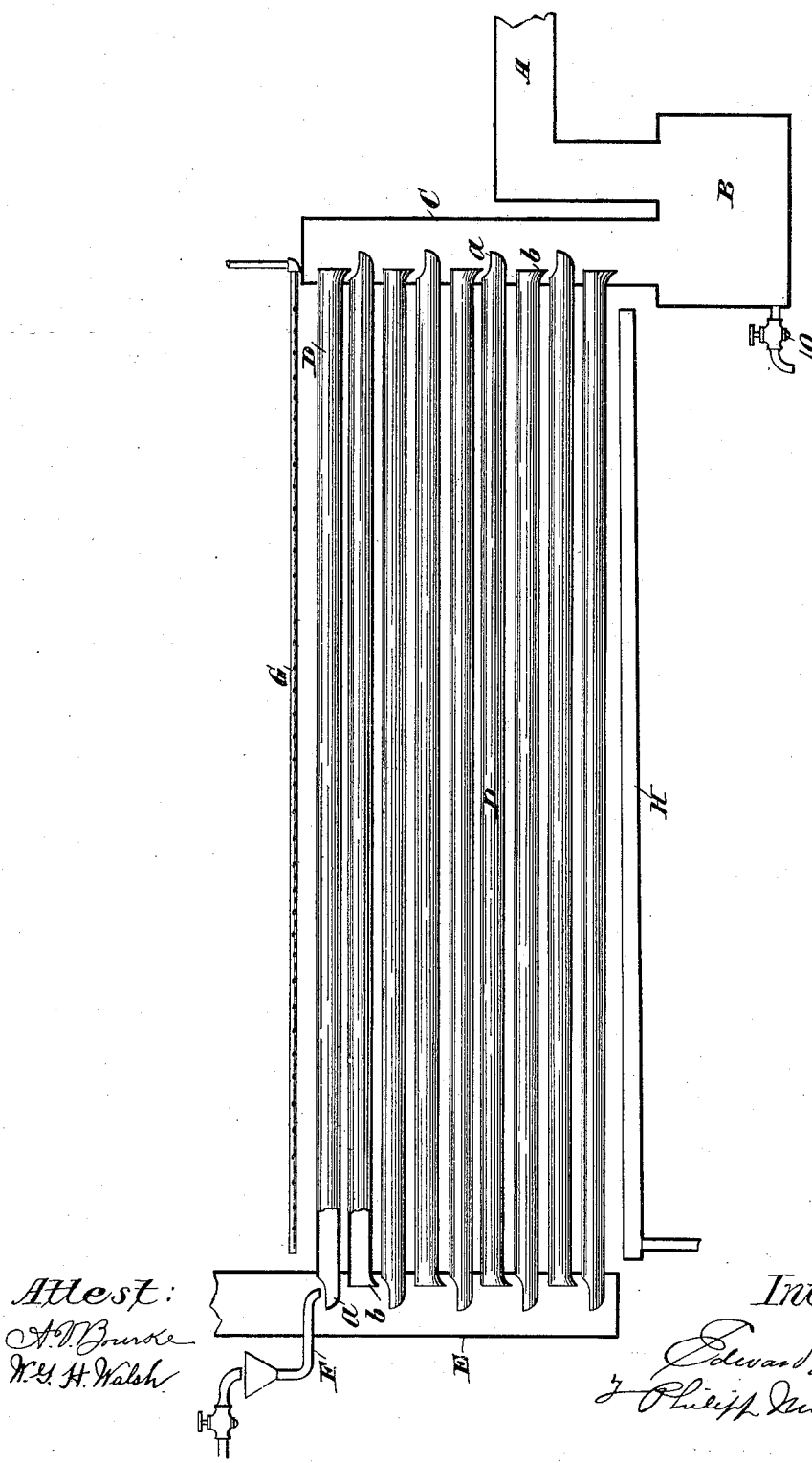
Attest:
A. T. Bourke
W. H. Walsh
Inventor:
Edward Hart
by Philipp, Munson & Phelps
Attys

UNITED STATES PATENT OFFICE.

EDWARD HART, OF EASTON, PENNSYLVANIA, ASSIGNOR TO THE BAKER & ADAMSON CHEMICAL COMPANY, OF SAME PLACE.

APPARATUS FOR CONCENTRATING ACIDS.

SPECIFICATION forming part of Letters Patent No. 601,466, dated March 29, 1898.

Application filed June 16, 1896. Serial No. 595,769. (No model.)

*To all whom it may concern:*

Be it known that I, EDWARD HART, a citizen of the United States, residing at Easton, county of Northampton, and State of Pennsylvania, have invented certain new and useful Improvements in Apparatus for Preparing Hydrochloric Acid and Similar Substances, fully described and represented in the following specification and the accompanying drawing, forming a part of the same.

This invention relates especially to the manufacture of hydrochloric acid and similar substances which are formed by the absorption of gases by liquids, the especial object of the invention being to provide an improved apparatus for this purpose by which the heat liberated by the condensation of the gas is efficiently removed, so as to quickly and conveniently secure a concentrated acid.

In the manufacture of hydrochloric and similar acids by the absorption of gases by liquids as heretofore practiced the gas has usually been passed upward through towers filled with coke, bricks, metal plates, or other open packing, downward through which water trickled, so as to condense and absorb the gas on the passage of the latter through the tower. In this method and apparatus the heat liberated by condensation is not removed, and consequently, since the amount of gas absorbed depends upon the temperature of the absorbing liquid, it has been impossible to secure a concentrated acid except by a succession of exposures to the cold gas and cooling the liquid by natural radiation of heat or otherwise between the operations.

The present invention combines the simultaneous absorption of the gas by the liquid and the cooling of the absorbing liquid, and in the apparatus for carrying out the invention in the preferred form and which apparatus forms a part of the invention the gas is absorbed by liquid within passages through which the gas and water flow, and the absorbing liquid is cooled by a cooling liquid applied to the walls of the passages, so as to remove continuously the heat liberated by condensation, the cooling liquid being applied, preferably, by sprinkling water over the pipes, which are preferably used to form the passages and preferably extend horizontally and are arranged one above the other, so that the absorbing liquid flows through the successive pipes from the top to the bottom of the series and the cooling water trickles down over the successive pipes, preferably being applied in such quantities as to be wholly or largely evaporated during the cooling operation. By this method and apparatus I am enabled to secure a concentrated acid by a single operation, the water absorbing the gas so as to become saturated therewith on account of the low temperature at which the water is maintained by the constant removal of the heat liberated by condensation of the gas.

For a full understanding of the invention a detailed description of an apparatus for carrying out the invention in the best form now known to me will now be given in connection with the accompanying drawing, forming a part of this specification, and the features forming the invention will then be specifically pointed out in the claims.

In the drawing, A is a pipe through which the gas to be absorbed enters the apparatus, preferably directly from the still; B, a receiver for the acid and from which the acid may be drawn off by the cock 10 or other suitable means; C, a vertical pipe rising from the top of the receiver B and to which the gas passes from the pipe A through the top of the receiver; D, horizontal or slightly-inclined pipes entering the pipe C at one end and at the opposite end communicating with a vertical pipe E; F, a pipe through which the absorbing liquid is introduced into the top pipe D; G, a perforated water-pipe above the pipes D for sprinkling cooling liquid on the latter, and H a trough below the pipes receiving any cooling liquid not evaporated as it passes over the pipes D. The pipes D form passages for the absorbing liquid and the gas, and these pipes are constructed so as to form at opposite ends troughs *a* and spouts *b*, the spout at the end of each pipe being above the trough at the end of the next pipe, so that the absorbing liquid, after passing through the whole length of a pipe D, is delivered into the next lower pipe, and thus passes through the whole series of pipes and then from the bottom pipe into the receiver B. It will thus be seen that the gas from the pipe A passes through the vertical pipe C into all the pipes D, where it is largely absorbed by the liquid passing successively through these pipes. Any excess of gas passing through the pipes D into the pipe E is delivered from the top of the pipe E as desired.

It will be understood that the invention may be embodied in constructions of widely-different form from that shown and that I am not to be limited to the specific apparatus illustrated, although this apparatus is preferred and in itself forms a part of the invention and may be used for other purposes than those specifically described.

What I claim is—

1. An apparatus for preparing hydrochloric acid and other substances formed by the absorption of gases by liquids, having a series of pipes arranged for the reception of the gas and absorbing liquid and for the passage of the gas and liquid through them in contact for absorption of the gas by the liquid, and means for applying cooling liquid to the pipes during the absorption operation to remove heat liberated by condensation of the gas, substantially as described.

2. An apparatus for preparing hydrochloric acid and other substances formed by the absorption of gases by liquids, having a series of horizontal pipes arranged for the delivery of the absorbing liquid from each pipe to the next pipe, whereby the absorbing liquid passes through said pipes successively, connections for supplying each of said pipes with gas independently of the others, and means for applying cooling liquid to said pipes during the absorption operation and carrying off the cooling liquid to remove the heat liberated by condensation of the gas, substantially as described.

3. In an apparatus for preparing hydrochloric acid and other substances formed by the absorption of gases by liquids, the combination with a series of pipes arranged for the reception of the gas and absorbing liquid and for the passage of the gas and liquid through them, and connections for supplying said pipes with gas and absorbing liquid, of means for sprinkling cooling liquid upon said pipes, substantially as described.

4. In an apparatus for preparing hydrochloric acid and other substances formed by the absorption of gases by liquids, the combination with a series of horizontal pipes arranged one above the other for the reception of the gas and absorbing liquid and for the passage of the gas and liquid through them, and connections for supplying said pipes with gas and absorbing liquid, of means for sprinkling cooling liquid upon said pipes, substantially as described.

5. In an apparatus for preparing hydrochloric acid and other substances formed by the absorption of gases by liquids, the combination with a series of horizontal pipes arranged one above the other and constructed and arranged for the delivery of the absorbing liquid from each pipe to the next pipe, whereby the absorbing liquid passes through said pipes successively, and connections for supplying said pipes with gas, of means for sprinkling cooling liquid upon said pipes, substantially as described.

6. In an apparatus for preparing hydrochloric acid and other substances formed by the absorption of gases by liquids, the combination with a series of horizontal pipes arranged one above the other and constructed and arranged for the delivery of the absorbing liquid from each pipe to the next pipe, whereby the absorbing liquid passes through said pipes successively, and connections for supplying each of said pipes with gas independently of the others, of means for sprinkling cooling liquid upon said pipes, substantially as described.

7. In an apparatus for preparing hydrochloric acid and other substances formed by the absorption of gases by liquids, the combination with the receiver B and pipe A from the still, of vertical pipe C rising from the receiver, horizontal pipes D entering said vertical pipe C and arranged one above the other, vertical pipe E entered by the opposite ends of said pipes D, said horizontal pipes D being arranged with their opposite ends above each other and formed to deliver absorbing liquid after its passage through one pipe to the end of the next lower pipe and thus through the pipes D to the receiver, means for supplying absorbing liquid to the top pipe D, and means for sprinkling water on said pipes D, substantially as described.

8. The combination with the horizontal pipes D arranged one above the other and constructed and arranged for the delivery of liquid after its passage through one pipe to the end of the next lower pipe, whereby the liquid passes through said pipes successively, of connections for supplying liquid to the top pipe D, connections for supplying said pipes with a current of aeriform fluid, and means for applying cooling liquid to said pipes, substantially as described.

9. The combination with the horizontal pipes D arranged one above the other and constructed and arranged for the delivery of liquid after its passage through one pipe to the end of the next lower pipe, whereby the liquid passes through said pipes successively, of connections for supplying liquid to the top pipe D, connections for supplying said pipes with a current of aeriform fluid, and means for sprinkling cooling liquid on said pipes D, substantially as described.

In testimony whereof I have hereunto set my hand in the presence of two subscribing witnesses.

EDWARD HART.

Witnesses:
GEO. E. KRESSLER,
J. RAY ABEL.